US010286259B2

(12) United States Patent
Hartelius (10) Patent No.: US 10,286,259 B2
(45) Date of Patent: May 14, 2019

(54) PLAY BALL WITH FOAM FILLING (71) Applicant: Mark Hartelius, Chicago, IL (US)

(72) Inventor: Mark Hartelius, Chicago, IL (US)

( * ) Notice: Subject to any disclaimer, the term of this patent is extended or adjusted under 35 U.S.C. 154(b) by 768 days.

(21) Appl. No.: 15/011,540

(22) Filed: Jan. 30, 2016

(65) Prior Publication Data
US 2017/0056733 A1   Mar. 2, 2017

Related U.S. Application Data (60) Provisional application No. 62/212,357, filed on Aug. 31, 2015.

(51) Int. Cl.
A63B 37/06 (2006.01)
A01K 15/02 (2006.01)
A63B 45/00 (2006.01)
A63B 37/14 (2006.01)
B29C 65/48 (2006.01)
B29C 65/02 (2006.01)
B29L 31/54 (2006.01)
B29L 31/52 (2006.01)
B29K 623/00 (2006.01)
B29K 621/00 (2006.01)

(52) U.S. Cl.
CPC ............ A63B 37/06 (2013.01); A01K 15/025 (2013.01); A63B 37/14 (2013.01); B29C 65/02 (2013.01); B29C 65/48 (2013.01); A63B 2037/065 (2013.01); B29K 2621/00 (2013.01); B29K 2623/083 (2013.01); B29K 2715/006 (2013.01); B29L 2031/5209 (2013.01); B29L 2031/529 (2013.01); B29L 2031/548 (2013.01)

(58) Field of Classification Search
CPC . A63B 37/0003; A63B 45/00; A63B 37/0076; A63B 37/0075; A63B 37/0074; A01K 15/025
USPC .................. 119/707; 473/374, 378, 600, 409
See application file for complete search history.

(56) References Cited

U.S. PATENT DOCUMENTS

| 4,229,401 A * | 10/1980 | Pocklington ....... A63B 37/0097 156/228 |
| 4,318,875 A | 3/1982 | Shrimpton et al. |
| 4,340,222 A * | 7/1982 | Kerkenbush ........... A63B 41/10 264/328.1 |
| 4,674,170 A * | 6/1987 | Hubbert ................ A63B 37/02 264/129 |

(Continued)

FOREIGN PATENT DOCUMENTS

| CN | 202682703 | 1/2013 |
| DE | 2911430 | 9/1980 |

(Continued)

Primary Examiner — Yvonne R Abbott-Lewis
(74) Attorney, Agent, or Firm — Robert W J Usher (57) ABSTRACT A play ball has a rubber shell filled with resilient foam having an entire outer peripheral surface thereof intimately attached by heat fusion and adhesive to an entire interior surface of the shell. Such attachment enables the foam to provide additional resiliency by foam tension, as well as by foam compression, thereby significantly extending the effective bounce life of the ball. A seamed dog chew toy has essentially similar construction such that the increased retention force provided by the intimate attachment of the foam to the shell resists the chewing force of the dog popping a seam improving durability.

7 Claims, 7 Drawing Sheets

(56) References Cited

U.S. PATENT DOCUMENTS

| | | | | |
|---|---|---|---|---|
| 4,840,378 A | * | 6/1989 | Molitor | A63B 37/00 473/600 |
| 5,018,450 A | * | 5/1991 | Smith | F42B 12/40 102/498 |
| 5,104,126 A | * | 4/1992 | Gentiluomo | A63B 37/0003 473/370 |
| 5,201,523 A | * | 4/1993 | Miller | B29C 45/14819 473/378 |
| 5,225,258 A | | 7/1993 | Nakamura et al. | |
| 5,306,001 A | * | 4/1994 | Shishido | A63B 41/00 473/604 |
| 5,558,325 A | | 9/1996 | Hargis et al. | |
| 5,688,192 A | * | 11/1997 | Aoyama | A63B 37/0003 473/369 |
| 6,030,304 A | | 2/2000 | Simonutti et al. | |
| 6,056,842 A | * | 5/2000 | Dalton | A63B 45/00 156/243 |
| 6,336,871 B1 | * | 1/2002 | Ihara | A63B 37/0003 473/367 |
| 6,369,125 B1 | * | 4/2002 | Nesbitt | A63B 37/12 473/354 |
| 6,719,653 B1 | * | 4/2004 | Nesbitt | A63B 37/02 473/600 |
| 6,855,071 B2 | * | 2/2005 | Endo | A63B 37/0003 473/355 |
| 7,211,012 B2 | * | 5/2007 | Laliberty | A63B 37/06 473/601 |
| 7,244,802 B2 | * | 7/2007 | Dewanjee | A63B 37/0003 473/374 |
| 7,927,235 B2 | * | 4/2011 | Yokota | A63B 37/0004 473/409 |
| 7,985,779 B2 | | 7/2011 | Vieghert et al. | |
| 8,920,262 B2 | * | 12/2014 | Kabeshita | A63B 37/004 473/376 |
| 8,974,329 B2 | * | 3/2015 | Laliberty | A63B 41/08 156/147 |
| 9,005,053 B2 | * | 4/2015 | Sullivan | A63B 37/0058 473/376 |
| 9,011,275 B2 | * | 4/2015 | Hebert | A63B 37/0003 473/378 |
| 9,132,317 B2 | * | 9/2015 | Tutmark | A63B 37/0019 |
| 2009/0318251 A1 | | 12/2009 | Limerkines et al. | |
| 2010/0261563 A1 | | 10/2010 | Verbeke et al. | |

FOREIGN PATENT DOCUMENTS

| | | |
|---|---|---|
| GB | 2008954 | 6/1979 |
| KR | 200100002975 | 1/2001 |

* cited by examiner

PLAY BALL WITH FOAM FILLING

RELATED APPLICATION

This application claims priority from my provisional application 62/212,357 filed Aug. 31, 2015, the disclosure of which is incorporated by reference

FIELD OF THE INVENTION

The invention relates to play balls and particularly, but not solely, to those similar to tennis balls.

BACKGROUND OF THE INVENTION

Many play or sports balls, such as tennis balls, are 'pressurized' by a gas filling and lose their bounce over time and use, as a result of the gas escaping from the ball shell.

Tennis balls are commonly made by gluing together respective rims of two molded rubber half shells; heating in a match mold to fuse the rims permanently together as a unitary member; injecting air or gas under pressure; gluing two (dumb-bell shape) felt pieces to the exterior in covering relation, applying heat fusible tape along a seam between the felt pieces; and, reheating in a match mold to fuse the tape with the adjacent edges of the felt pieces.

There have been numerous prior attempts over many years to perfect ball structures to obviate or reduce such disadvantageous loss of bounce, for example by so-called pressureless ball structures. One such approach dispenses with the traditional resilient (rubber) shell or hollow core entirely, relying instead on a solid core of a resilient foam composition. Another approach teaches a pressureless ball made by replacing/augmenting the rubber of the shell or hollow core with more durable/resilient compositions. In a further approach, a resiliently compressible foam core fills the shell by continued expansion within the shell itself.

SUMMARY OF THE INVENTION

One object of the invention is to provide a play ball of equivalent bounce to traditional, pressurized balls but with increased bounce duration and effective life without significant increase in weight, by filling the traditional rubber shell with resiliently compressible foam which is attached to the entire inside surface of the shell.

According to the invention, a play ball comprises an elastomeric (e.g. rubber) shell filled with a resiliently compressible foam body attached intimately over an entire peripheral surface thereof to an entire inside surface of the shell.

The attachment of the foam periphery to the shell interior enables the foam to provide additional resiliency by foam tension, in addition to resiliency by foam compression, thereby significantly extending the effective bounce life of the ball.

The attachment is preferably by both heat fusion of the contacting surfaces of the shell and foam filling and adhesive coated thereon.

In accordance with the invention, when the ball is of a tennis ball type, a pre-shaped/formed foam filling can be assembled with the molded rubber ball shell quite simply at an otherwise conventional stage in the manufacture of a tennis ball by confining the pre-shaped foam filling body between two rubber half shells in compression, as a force fit, and fusing the interior surface of the rubber shell to the foam periphery by heating such assembly in the same match mold that would otherwise be used during the conventional step of heat fusing together the rims of the half shells to make the tennis ball shell.

Preferably, the foam body is coated with an adhesive prior to confinement in the shell, thereby providing an additional retention force to the interior surface of the shell.

According to one aspect, the invention provides a method for making a play ball comprising the steps of:

molding two, resiliently flexible, complementary half shells of rubber having engageable rims;

providing a resiliently compressible foam body shaped to fill a shell assembled by engagement of said rims;

assembling the half shells together enclosing the foam body by engaging said rims (to form a unitary member); and, fusing interior surfaces of the rubber half shells with the periphery of the foam body and fusing the rims together, as by heating the assembly (in a match mold).

Preferably, the method further comprises the step of maintaining the rims in engagement by the application of glue prior to heating.

Preferably, the foam is EVA.

In a preferred aspect in which the play ball is a type of tennis ball, the method comprises the further steps of:

subsequently adhering a bipartite, felt cover wrapping to the peripheral surface of the shell assembly with an elongate seam extending between adjacent respective edge portions of the respective parts;

adhering a heat fuseable (polymer) tape along the seam; and fusing the tape into respective adjacent edges of the felt by heating in a match mold so that shrinkage of the tape on cooling draws together opposite edges of the respective parts together along the seam.

The additional resiliency provided by the foam filling facilitates manual application of the felt to the shell.

The rubber wall of the shell can have a thickness of 2 mm to 4 mm and the felt can have a thickness of between 50% and 100% of the thickness of the rubber wall of the shell.

According to a further aspect of the invention, a play ball comprising a resiliently flexible rubber shell having a filling of resilient foam with an outer periphery thereof attached around an interior surface of the shell.

The attachment of the foam to the shell interior enables the foam to provide additional resiliency, not only by compression of the foam but also by tension, significantly extending the effective bounce life of the play ball.

Preferably, the rubber is fused to the outer periphery of the foam by heating to provide the attachment.

Additionally, the invention provides a dog bouncing toy in which the shell of the play ball can have eccentric protuberances filled with the foam or formed by a localized increases in thickness of only a portion of the shell wall.

BRIEF DESCRIPTION OF THE DRAWINGS

A specific embodiment of the invention will now be described by way of example only and by reference to the accompanying drawings in which.

PARTICULAR EMBODIMENT

Figure 1:
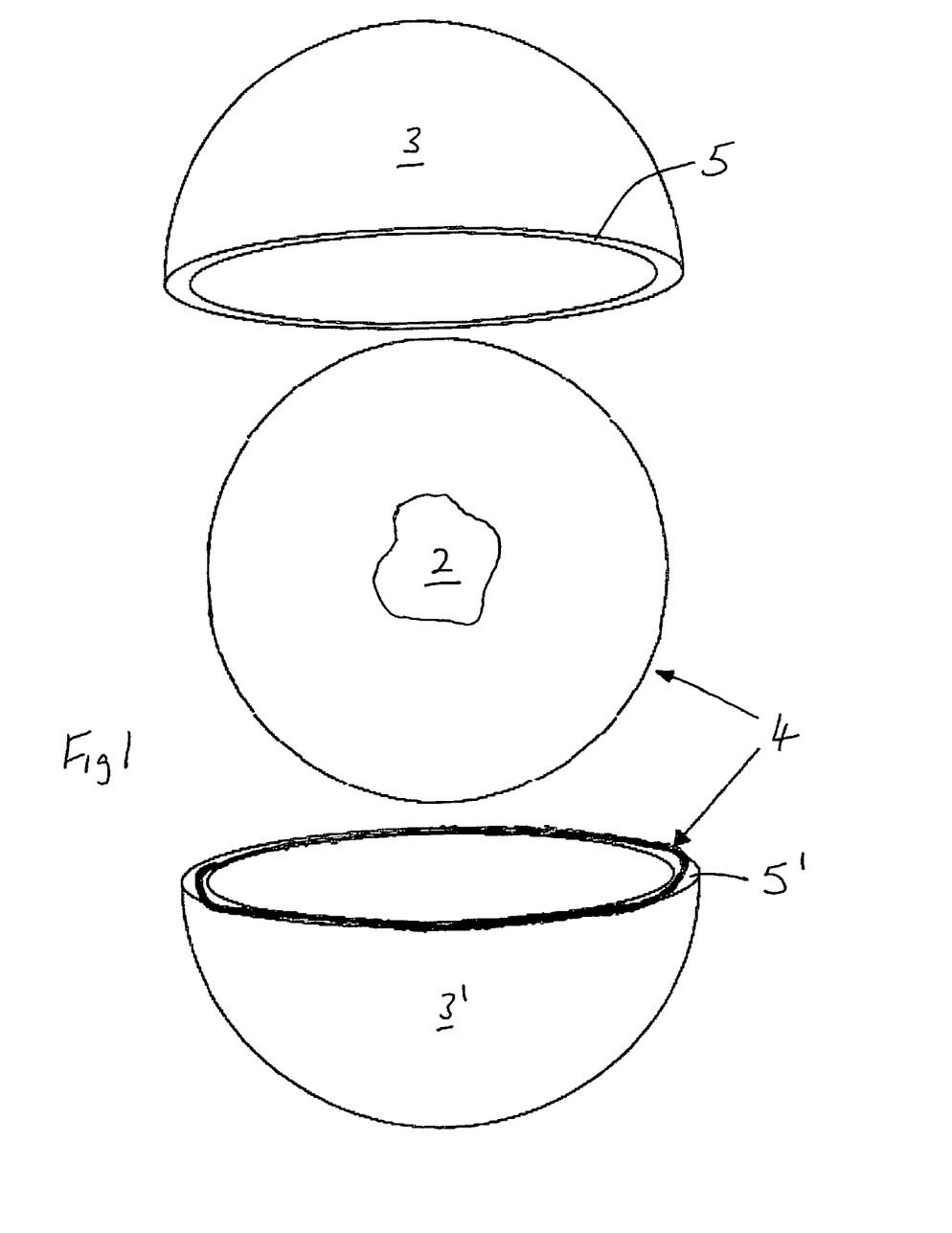
FIG. 1 is a diagrammatic view of a resiliently compressible, adhesive coated, foam core, aligned between upper and lower half shells for placement in the lower shell and assembly of the rubber half shells together by engagement of their rims to form a unitary member, the lower rim having a coating of adhesive.
Figure 2:
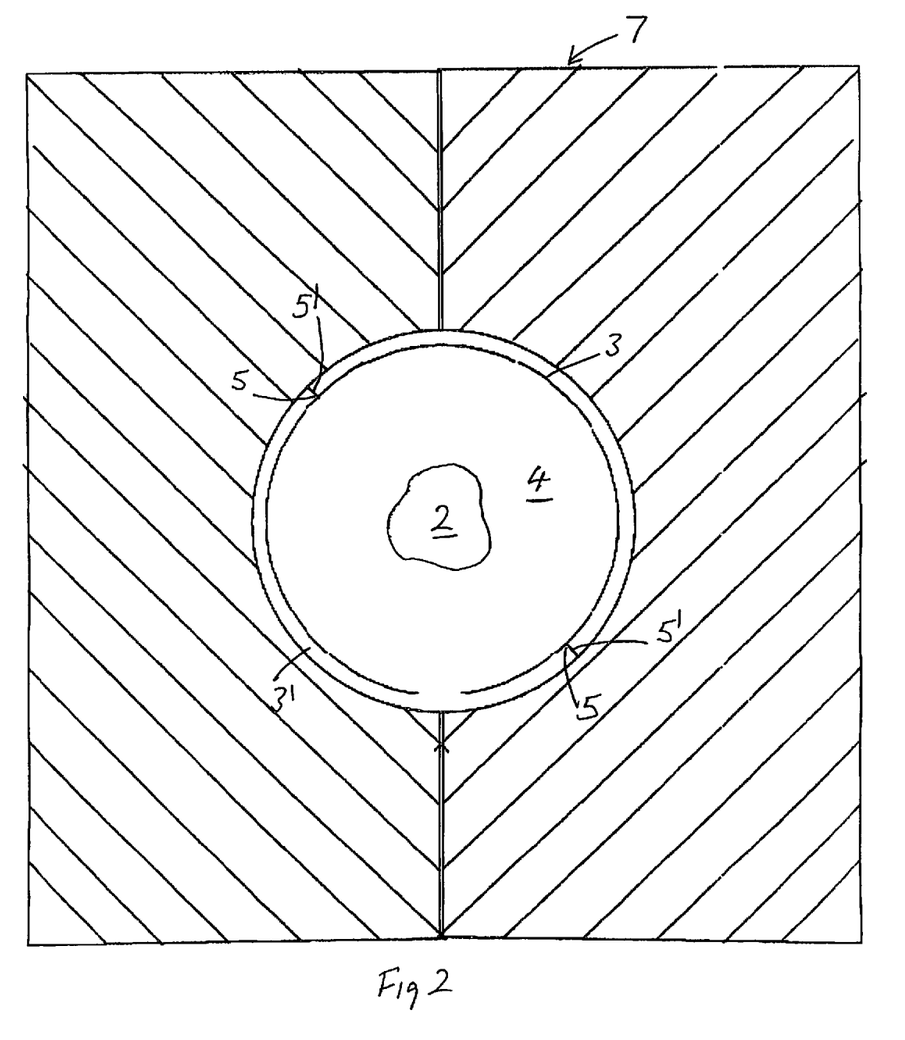
FIG. 2 is a diagrammatic section showing the unitary member being heated in a match mold for heat fusing the inner surfaces of the half shells to the outer periphery of the foam heat and for fusing the rims together to form a permanent unitary member.

Referring particularly to FIGS. 1 and 2, a unitary, spherical, fully expanded, filling body of EVA 2 foam, (diameter 67 mm.), molded to match the interior surfaces of upper and lower, molded, hemispherical rubber half shells 3, 3', (diameter 64 mm), as a force fit, has the entire periphery coated (by tumbling) with RTV adhesive 4, The adhesive coated foam body is then (manually) force fitted into the lower half shell 3', which also has a bead of the same adhesive 4 applied around the rim 5, and the upper half shell then force fitted onto the exposed portion of the filling body such that rims 5', 5 of respective half shells are retained engaged together, confining the filling 2 in resiliently compressed condition between them to temporarily form a unitary member. The unitary member is then placed in a match mold 7, as shown in FIG. 2, and heated to 150 degrees F. which ensures that not only the rims are fused and adhered permanently engaged together, but also fuses the entire inner surfaces of the rubber half shells to the periphery of the filling body, reinforced by the adhesive.

Figure 3:
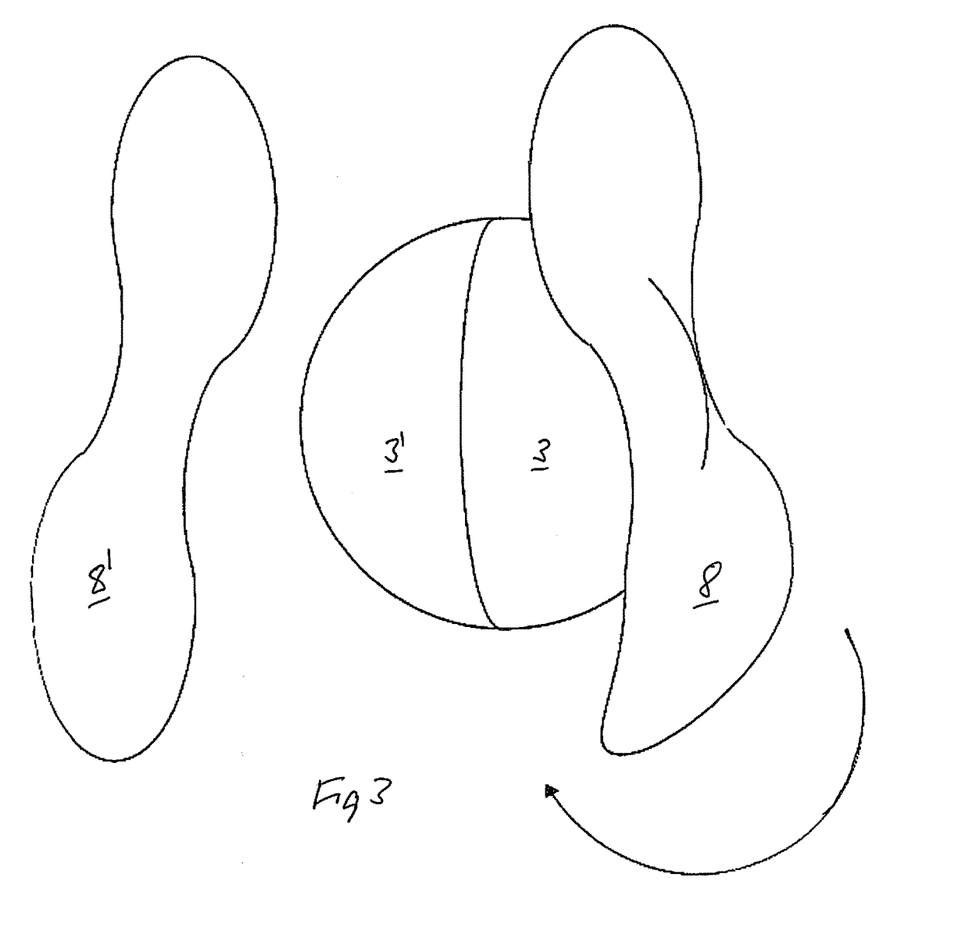
FIG. 3 is a diagrammatic view showing wrapping the two pieces of 'tennis ball' type felt to the surface of the unitary member.
Figure 4:
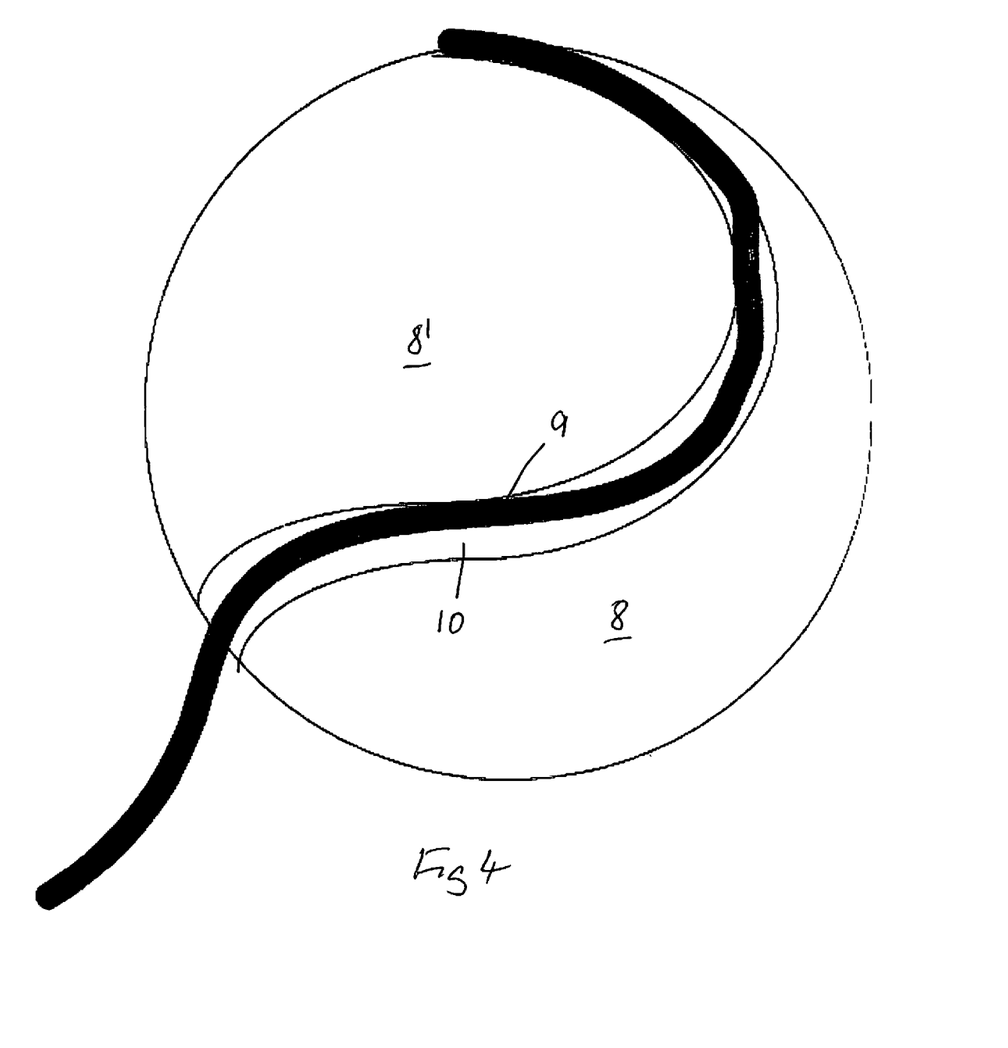
FIG. 4 is a diagrammatic view showing a polymer tape being applied along the seams between the two pieces of felt; and, FIG. 5 is a diagrammatic section showing the felt and tape covered unitary member being heated in a match mold to fuse the tape to opposed edges of the felt pieces.
Figure 5:
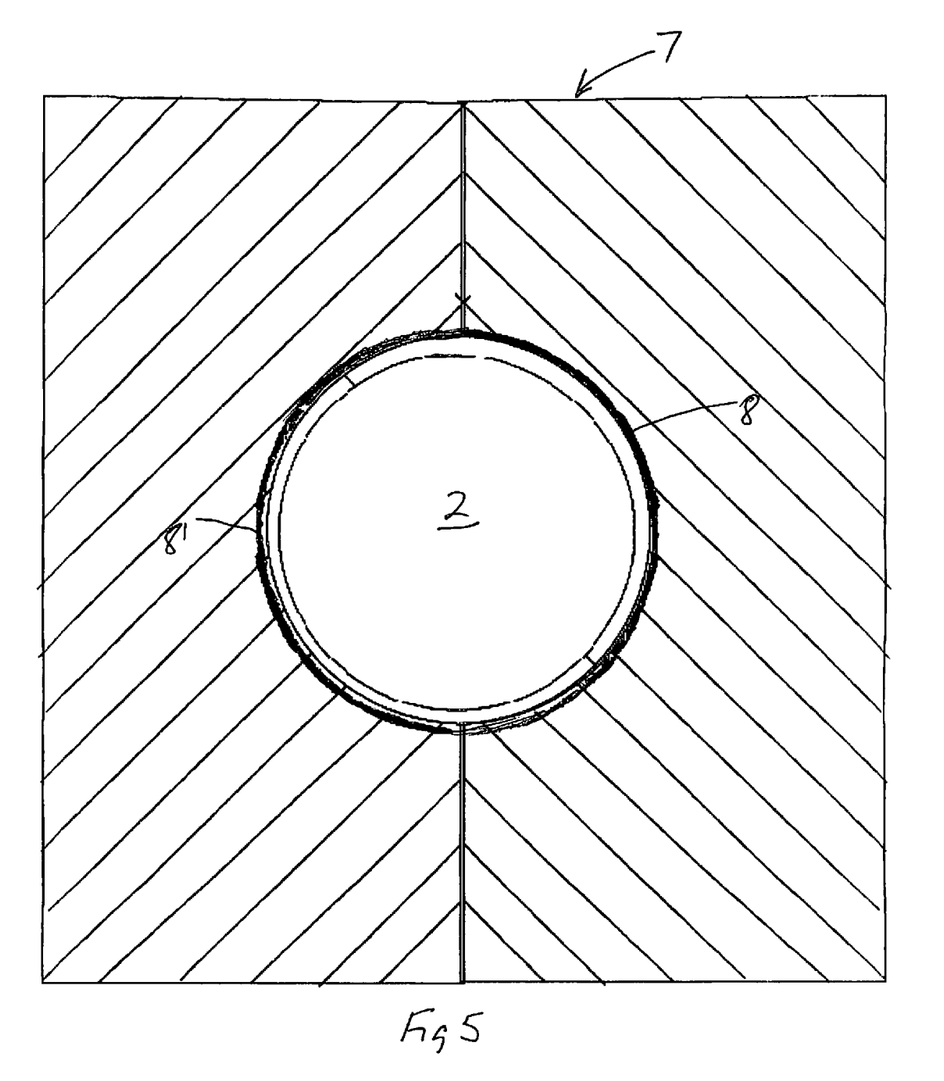
Figure 6:
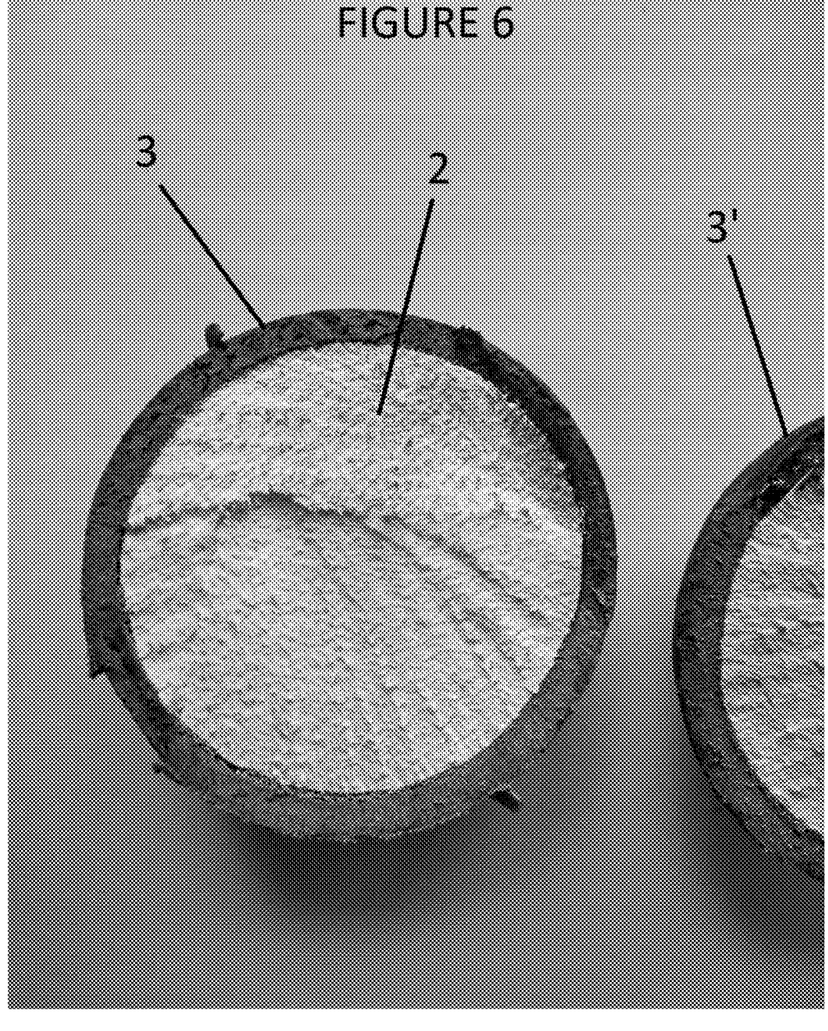
FIG. 6 is a photograph of a section sawn through the center of a similar unitary member but showing intimate attachment of the filling body only by fusion to the interior surfaces of the shell (i.e adhesive omitted)

As shown in FIG. 3, a pair of conventional, adhesive backed, felt pieces 8, 8' of dumb bell shape to cover the entire surface of the unitary member are then wrapped in conventional fashion around respective half shells to extend over the other half shell and a polymer tape 9 adhered along a seam 10 between the felt pieces in known manner. The assembly so formed is then again heated in a match mold to fuse the tape with the adjacent edge portions of the felt so that the shrinkage of the tape on cooling draws the felt edges together, tightening the wrapping.

Additional exemplary diameters of the sizes of the foam and shell are 45 mm and 38 mm. respectively The rubber wall of the shell has a thickness of 2 mm to 4 mm and the felt has a thickness of between 50% and 100% of the thickness of the rubber wall of the shell.

Figure 7A:
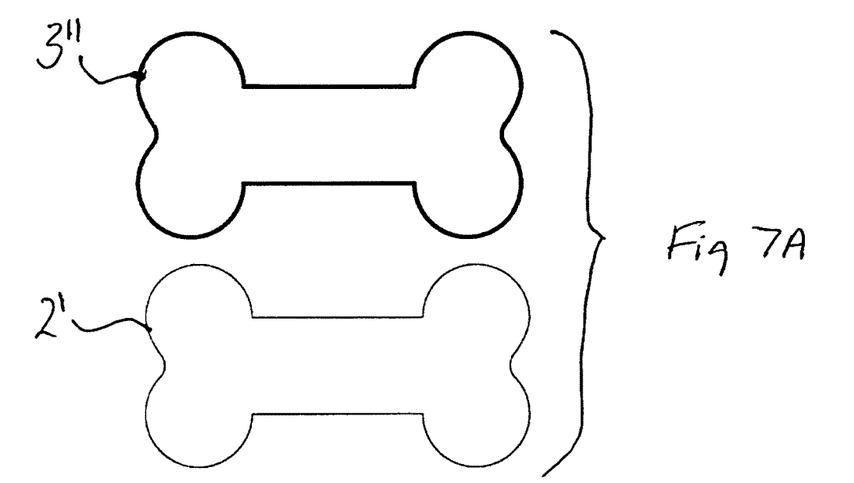
FIGS. 7A and 7B are diagrammatic plan and perspective views, respectively, of a dog chew toy comprising a bone—shape half shell and correspondingly shaped EVA foam shaped to fill the half shell.
Figure 7B:
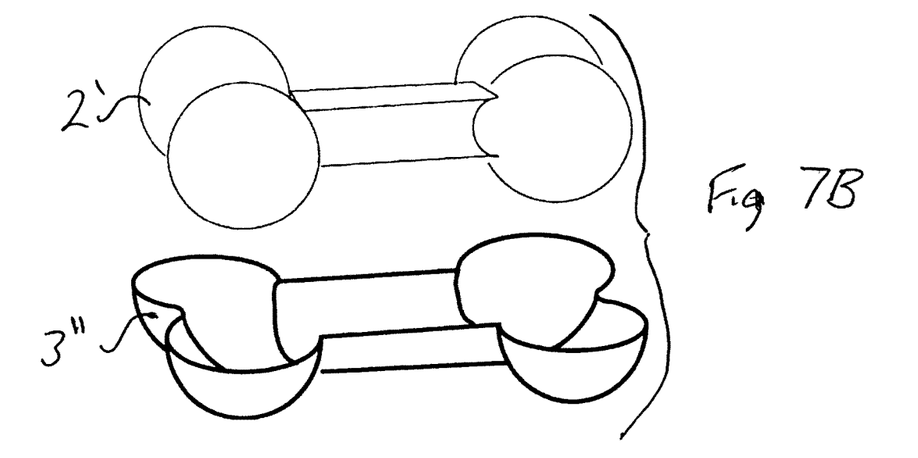

The invention provides a particularly durable dog toy as the additional retention/pulling force provided by the intimate attachment of the foam filling 2' to the shell 3" structure largely prevents popping of the shell seams and the shell itself during chewing. Forming the toy in the shape of a traditional bone, as shown in FIGS. 7A and 7B, adds to the amusement. Traditional tennis ball type felt can be adhered to the exterior to provide a desirably 'plush' look and feel.

The invention claimed is:

1. A method for making a play ball comprising the steps of:
   providing two, resiliently flexible, complementary elastomeric half shells having engageable rims;
   providing a resiliently compressible foam body with a periphery shaped to fill a shell assembled by engagement of said rims;
   assembling the half shells together enclosing the foam body by engaging said rims;
   heating the assembly in a match mold, both fusing the rims together and fusing an entire interior surface area of the elastomeric half shells to an entire periphery of the foam body and,
   further comprising the step of coating the periphery of the foam body with adhesive prior to enclosure in the half shells so that the periphery of the foam body is also attached to the half shells by the adhesive.

2. The method according to claim 1 wherein the periphery of the foam body is shaped independently of the half shells.

3. The method according to claim 1 further comprising the step of maintaining the rims in engagement prior to the heating step by applying adhesive to the rims.

4. The method according to claim 1 wherein the foam is EVA.

5. The method according to claim 1 in which the play ball is a tennis ball, and comprising the further steps of:
   subsequently adhering a bipartite, felt cover wrapping to the peripheral surface of the shell assembly with an elongate seam extending between adjacent respective edge portions of the respective parts;
   adhering a heat fusable polymer tape along the seam; and
   fusing the tape into respective adjacent edges of the felt by heating in a match mold so that shrinkage of the tape on cooling draws together opposite edges of the respective parts together along the seam.

6. The method according to claim 5 wherein the elastomeric wall of the shell is rubber and has a thickness of 2 mm to 4 mm and the felt has a thickness of between 50% and 100% of the thickness of the rubber wall of the shell.

7. A method for making a play ball comprising the steps of:
   providing two, resiliently flexible, complementary elastomeric half shells having engageable rims;
   providing a resiliently compressible foam body with a periphery shaped to fill a shell assembled by engagement of said rims;
   coating the periphery of the foam body and said rims with adhesive;
   assembling the half shells together enclosing the foam body by engaging said rims thereby both adhering said rims together and adhering an entire periphery of the foam body to an entire interior surface area of the elastomeric half shells.

* * * * *